(12) United States Patent
Yucel

(10) Patent No.: US 7,468,946 B2
(45) Date of Patent: Dec. 23, 2008

(54) TECHNIQUES FOR PROVISIONING VPNS IN THE HOSE MODEL

(75) Inventor: Sakir Yucel, Wexford, PA (US)

(73) Assignee: Ericsson AB, Stockholm (SE)

( * ) Notice: Subject to any disclaimer, the term of this patent is extended or adjusted under 35 U.S.C. 154(b) by 705 days.

(21) Appl. No.: 10/883,533

(22) Filed: Jun. 30, 2004

(65) Prior Publication Data

US 2006/0002417 A1 Jan. 5, 2006

(51) Int. Cl.
 *H04L 12/26* (2006.01)
(52) U.S. Cl. ..................................................... 370/235
(58) Field of Classification Search ....................... None
 See application file for complete search history.

(56) References Cited

U.S. PATENT DOCUMENTS

| | | | |
|---|---|---|---|
| 6,914,883 B2 * | 7/2005 | Dharanikota | 370/230.1 |
| 2002/0181508 A1 * | 12/2002 | Mo et al. | 370/477 |
| 2004/0190517 A1 * | 9/2004 | Gupta et al. | 370/392 |
| 2004/0255049 A1 * | 12/2004 | Italiano et al. | 709/250 |
| 2005/0068964 A1 * | 3/2005 | Wright et al. | 370/395.21 |
| 2005/0169179 A1 * | 8/2005 | Antal et al. | 370/231 |
| 2005/0265258 A1 * | 12/2005 | Kodialam et al. | 370/254 |

OTHER PUBLICATIONS

Kumar, A. et al "Algorithms for Provisioning Virtual Private Networks in the Hose Model" IEEE/ACM Transactions on Networking, vol. 10, No. 4, Aug. 2002, pp. 565-578.*

Erlebach, T. et al "Optimal Bandwidth Reservation in Hose-Model VPNs with Multi-Path Routing" IEEE INFOCOM 2004.*

Juttner, A. et al "On Bandwidth Efficiency of the Hose Resource Management Model in Virtual Private Networks" IEEE 2003, pp. 386-395.*

* cited by examiner

*Primary Examiner*—Anh-Vu H Ly
(74) *Attorney, Agent, or Firm*—Ansel M. Schwartz

(57) ABSTRACT

A telecommunications system using a hose model having a VPN network. The system includes a plurality of sites in communication with the VPN network. Each site requires an amount of bandwidth to introduce hose into the network. The system includes a network manager in communication with the sites through the network. The manager chooses a predetermined number of the sites as a function of their amount of bandwidth required to introduce hose into the network, establishes shortest paths between each of the chosen sites, and uses the established shortest paths for sites not chosen to send hose to and receive hose from the network. A method for provisioning VPNs in a hose model including the steps of determining an amount of bandwidth that a plurality of sites of a VPN network require to introduce hose into the network and receive hose from the network. There is the step of choosing a predetermined number of the sites as a function of their amount of bandwidth required to introduce hose into the network. There is the step of establishing shortest paths between each of the chosen sites. There is the step of using the established shortest paths for sites not chosen to send hose to and receive hose from the network.

19 Claims, 2 Drawing Sheets

TECHNIQUES FOR PROVISIONING VPNS IN THE HOSE MODEL

FIELD OF THE INVENTION

The present invention is related to provisioning VPNs in a hose model in a telecommunications system. More specifically, the present invention is related to provisioning VPNs in a hose model in a telecommunications system by choosing a predetermined number of sites of the network as a function of their amount of bandwidth required to introduce hose into the network.

BACKGROUND OF THE INVENTION

The present invention addresses the problem of provisioning a virtual private network among a set of sites. Pipe and hose models have been utilized by the VPN service providers in order to meet the bandwidth requirements of VPN customers. Although the hose model allows greater flexibility and statistical multiplexing advantages by permitting traffic among hose end points to be distributed arbitrarily, it comes up with provisioning challenges with respect to efficient bandwidth utilization for the VPN service provider.

SUMMARY OF THE INVENTION

The present invention pertains to a telecommunications system using a hose model. The system comprises a VPN network. The system comprises a plurality of sites in communication with the VPN network. Each site requires an amount of bandwidth to introduce hose into the network. The system comprises a network manager in communication with the sites through the network. The manager chooses a predetermined number of the sites as a function of their amount of bandwidth required to introduce hose into the network, establishes shortest paths between each of the chosen sites, and uses the established shortest paths for sites not chosen to send hose to and receive hose from the network.

The present invention pertains to a method for provisioning VPNs in a hose model. The method comprises the steps of determining an amount of bandwidth that a plurality of sites of a VPN network require to introduce hose into the network and receive hose from the network. There is the step of choosing a predetermined number of the sites as a function of their amount of bandwidth required to introduce hose into the network. There is the step of establishing shortest paths between each of the chosen sites. There is the step of using the established shortest paths for sites not chosen to send hose to and receive hose from the network.

The present invention provides efficient techniques for finding solutions to the hose provisioning problem.

Efficient techniques are presented herein to find solutions close the most optimum solution for the provisioning of VPNs in hose model. These techniques can be used for many different VPN technologies including ATM and Frame Relay based VPNs as well as the BGP/MPLS VPNs.

BRIEF DESCRIPTION OF THE DRAWINGS

In the accompanying drawings, the preferred embodiment of the invention and preferred methods of practicing the invention are illustrated in which:

FIG. 2b shows a different bandwidth allocation with lower bandwidth than that of FIG. 2a.

DETAILED DESCRIPTION

Figure 3:
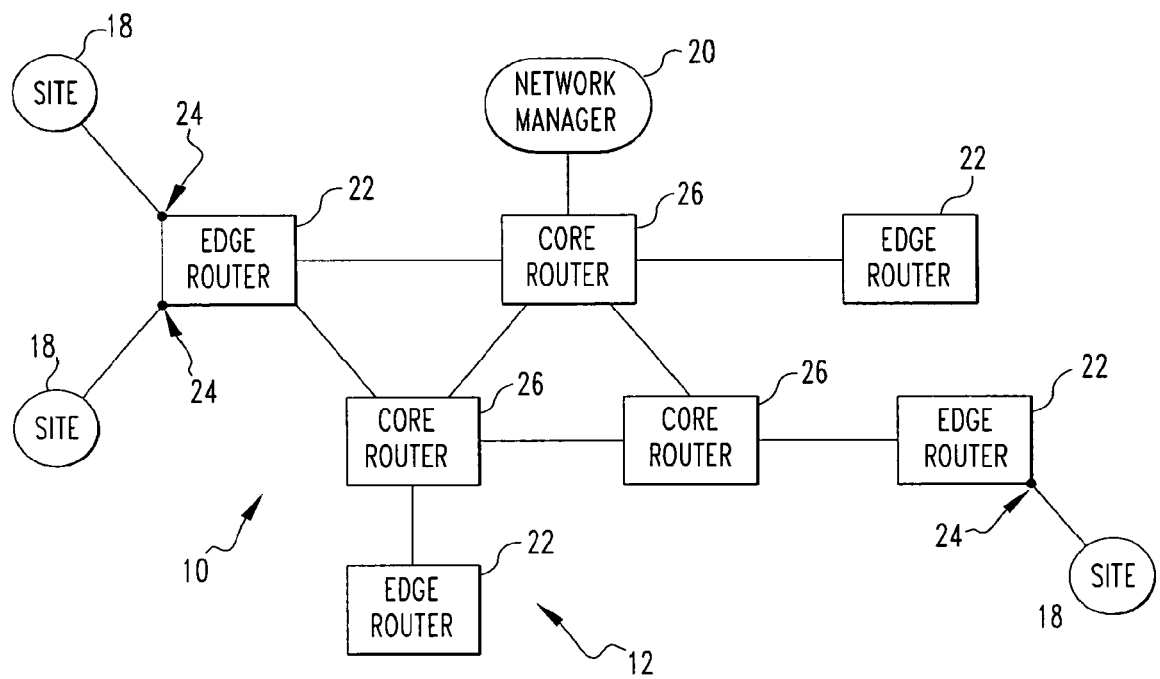
FIG. 3 is a schematic representation of the system of the present invention.

Referring now to the drawings wherein like reference numerals refer to similar or identical parts throughout the several views, and more specifically to FIG. 3 thereof, there is shown a telecommunications system 10 using a hose model. The system 10 comprises a VPN network 12. The system 10 comprises a plurality of sites 18 in communication with the VPN network 12. Each site requires an amount of bandwidth to introduce hose into the network. The system 10 comprises a network manager 20 in communication with the sites 18 through the network. The manager 20 chooses a predetermined number of the sites 18 as a function of their amount of bandwidth required to introduce hose into the network, establishes shortest paths between each of the chosen sites 18, and uses the established shortest paths for sites 18 not chosen to send hose to and receive hose from the network.

Preferably, the network includes edge routers 22 and core routers 26. The manager 20 finds shortest paths among edge routers 22 over the core routers 26 of the network. The manager 20 preferably chooses the predetermined number of sites 18 as a function of requiring the largest amount of bandwidth to introduce hose into the network. Preferably, the manager 20 eliminates any links where residual bandwidth is less than a smallest bandwidth request from the sites 18. The VPN network 12 preferably includes a provider network 14, at least one customer network 16, and Service Access Points 24 through which the customer networks 16 are attached to the provider network 14 and the manager 20 finds the shortest path from each SAP to all sites 18 over links which can satisfy the largest amount of bandwidth requirements of sites 18 to introduce hose into the network. Preferably, the manager 20 sorts in decreasing order the amount of bandwidth requirements of the sites 18 to introduce hose into the network.

The manager 20 preferably sorts in decreasing order the amount of bandwidth requirements of the sites 18 to introduce hose into and receive hose from the VPN network 12 as being equivalent. Preferably, the manager 20 sorts in decreasing order the amount of bandwidth requirements of the sites 18 to introduce hose into the VPN network 12 and in decreasing order the amount of bandwidth requirements of the sites 18 to receive hose from the VPN network 12. The manager 20 preferably finds the shortest paths from each SAP in communication with the predetermined number of sites 18 chosen having the largest amount of bandwidth requirements to introduce hose into the VPN network 12, to each SAP in communication with sites 18 having the largest amount of bandwidth requirements to receive hose from the VPN network 12.

The present invention pertains to a method for provisioning VPNs in a hose model. The method comprises the steps of determining an amount of bandwidth that a plurality of sites 18 of a VPN network 12 require to introduce hose into the network and receive hose from the network. There is the step of choosing a predetermined number of the sites 18 as a function of their amount of bandwidth required to introduce hose into the network. There is the step of establishing shortest paths between each of the chosen sites 18. There is the step of using the established shortest paths for sites 18 not chosen to send hose to and receive hose from the network.

Preferably, the establishing step includes the step of finding shortest paths to edge routers 22 of the network. The choosing step preferably includes the step of choosing the predetermined number of sites 18 as a function of requiring the largest amount of bandwidth to introduce hose into the network. Preferably, there is the step of eliminating any links where residual bandwidth is less than a smallest bandwidth request from the sites 18.

The finding step preferably includes the step of finding the shortest path from each SAP to all other sites 18 over links which can satisfy the largest amount of bandwidth requirements of sites 18 to introduce hose into the network. The choosing step preferably includes the step of connecting all edge routers 22 of the network which have yet to be connected with the sites 18. Preferably, the determining step includes the step of sorting in decreasing order the amount of bandwidth requirements of the sites 18 to introduce hose into the network.

The sorting step preferably includes the step of sorting in decreasing order the amount of bandwidth requirements of the sites 18 to introduce hose into and receive hose from the network as being equivalent. Preferably, there is the step of sorting in decreasing order the amount of bandwidth requirements of the sites 18 to introduce hose into the network and in decreasing order the amount of bandwidth requirements of the sites 18 to receive hose from the network. The finding step preferably includes the step of finding shortest paths from each SAP in communication with the predetermined number of sites 18 chosen having the largest amount of bandwidth requirements to introduce hose into the network, to each SAP in communication with sites 18 having the largest amount of bandwidth requirements to receive hose from the network.

In the operation, Virtual Private Networks (VPNs) are considered to be the services that support communication of group of nodes in a large underlying network. Rather than building a new physical network for the group of nodes, bandwidth is reserved in the underlying network for communication within the group, forming a virtual "sub-network". Service providers providing VPN services for their customers usually offer two VPN bandwidth specification and provisioning models.

In the first model, namely the customer pipe model or pipe model for short, the customer specifies traffic requirement from one site to all sites 18 in a traffic matrix. The VPN provider provisions paths between each source-destination pairs. The VPN provider needs to provision enough bandwidth to satisfy the Service Level Agreement (SLA) with the VPN customer. The pipe model has issues with specification as well as with provisioning: the customer has to provide the traffic matrix, which might be difficult to construct with increasing number of sites 18 (e.g when new sites are added) and with changing traffic characteristics. The provider has to allocate and reserve paths to support the pipes. This usually results over provisioning and cannot take the advantage of statistical multiplexing.

Figure 1:
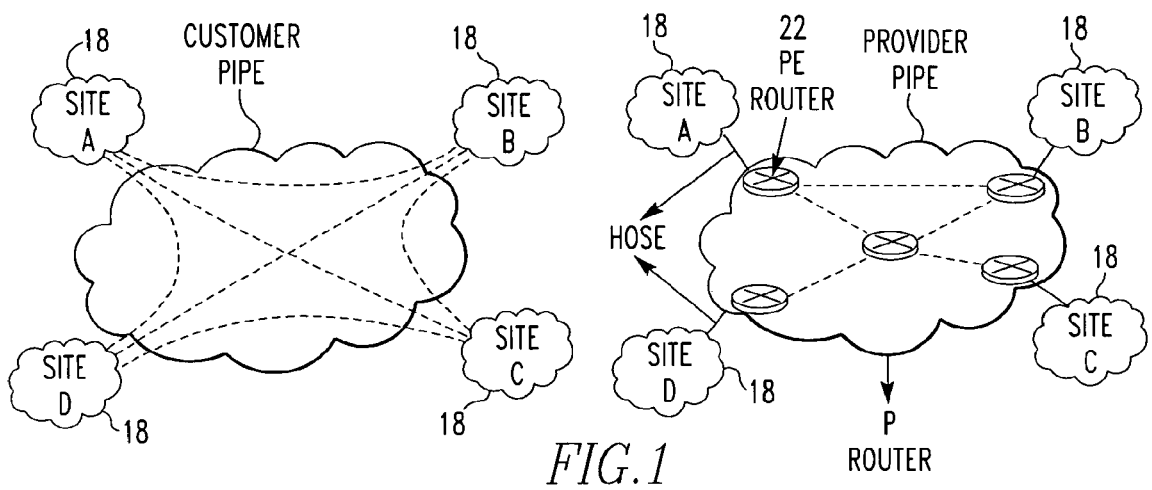
FIG. 1 shows pipe and hose models in VPN bandwidth specification and provisioning.

The second model, the hose model, is characterized by the aggregate traffic to and from one customer endpoint. Therefore, hose can be specified with a traffic vector. It has advantages over the pipe model in both specification as well as provisioning. These two models are illustrated in FIG. 1.

Hose Model Definition

In the definition herein, PE router will stand for provider edge router. It is the edge router in VPN provider's network. P router will stand for provider router, which is the core router in VPN provider's network.

Given a graph $G=(V,E)$ with vertices V, edges E for a VPN where $V=\{PE\} \cup \{P\}$, $C_{ij}$ is the capacity and $R_{ij}$ is the residual bandwidth for edge $(i,j)$, A hose specification where Bkin is the bandwidth amount of hose into PE router k, Bkout is the bandwidth amount of hose out of PE router k, Pkl is the path between PE routers k and l, L(Pkl) is the bandwidth for path Pkl.

Find the Pkl and L(Pkl) where L(Pkl)<$R_{ij}$ for all $(i,j) \in$ Pkl, and

L(Pkl) is minimized and

L(Pkl)=Bkin for all l and L(Pkl)=Bkout for all k.

Note that in $V=\{PE\} \cup \{P\}$, Service Access Points (SAPs) 24 through which the customer networks 16 are attached to the provider network 14 are abstracted in PEs for simplicity of notation. The invention herein presents techniques for solving this problem.

Figure 2A:
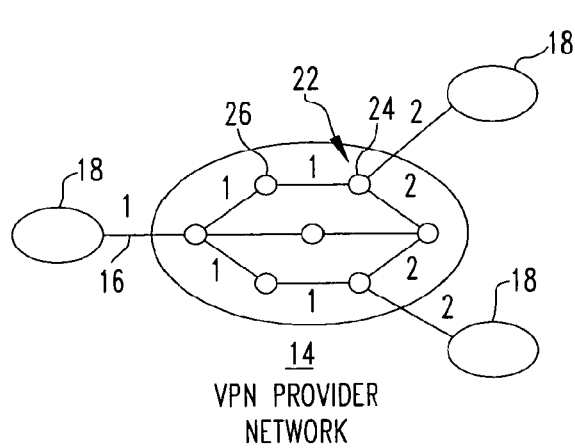
FIG. 2a shows a hose model example with a bandwidth allocation based on shortest paths.
Figure 2B:
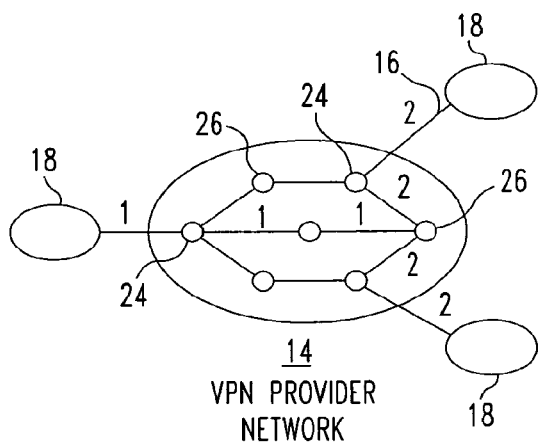

FIGS. 2a and 2b show two examples of hose provisioning. The objective in this example is to reduce the total allocated bandwidth, and as such, other parameters like delay is not considered in this example. As seen in FIGS. 2a and 2b, bandwidth allocation in FIG. 2b provides a better hose provisioning.

Hose Model offers
1. Ease of Specification
2. Flexibility
3. Statistical Multiplexing Gains Flexibility is achieved by permitting the traffic among hose end points to be distributed arbitrarily rather than restricting certain amounts to go to certain destinations as in pipe.

On the other hand, hose Model brings up challenges in resource management for the VPN provider due to the weaker traffic specification. Specifically:

1. NP-hard solution: Optimum Hose provisioning can be reduced to Steiner Tree problem, which is known to be NP-hard. N. G. Duffield, P. Goyal, A. G. Greenberg, P. P. Mishra, K. K. Ramakrishnan, J. E. van der Merwe, A flexible model for resource management in virtual private networks, Proceedings ACM SIGCOMM'99, Computer Communication Review, Vol 29, No 4, October 1999, pp. 95-108, incorporated by reference herein.
2. Under-provisioned paths: Due to statistical multiplexing, some paths may be under-provisioned.
3. Worst Case Bandwidth Efficiency Issue: More traffic may go to certain regions. It is a service provider policy whether or not provision for the worst cases.

Proposed Techniques for Hose Provisioning

As the optimum hose provisioning is an NP-hard problem, a heuristic to find a solution close to the optimum one in polynomial time is devised. The heuristic is:

Find the path(s) that would potentially carry more traffic than others,

Try to route PE traffic over such path(s).

Two techniques are given below utilizing this heuristic, one for symmetric and the other for asymmetric hose provisioning.

1. Algorithm for Symmetric Hose Provisioning

In this algorithm, it is assumed that Bkin=Bkout for all PE router k's, that is, the amount of requested bandwidth by the VPN customer is the same for both into the and out of the VPN network 12 through the PE router k. Denote it by Bk. The algorithm:

1. Sort the Bk's in decreasing order.
2. Select n largest Bks, Bki for $0<=i<=(n-1)$ where Bk0 is the largest and Bk(n-1) is the smallest hose bandwidth amount. Name this list of Bks as V(Bk).

3. Find separate shortest paths among each of the pairs in V(Bk). This step creates a mesh of paths among all Bks in the list V(Bk).

Eliminate all the links lij e E such that Rij<Bk(n-1). Call the new set of edges as E'. This will identify the shortest paths that meet the capacity and worst case constraints identified in the definition of the hose-provisioning problem. A pre-step to finding the shortest paths in this algorithm, as in the generic constraint based routing algorithm, is to prune the links that would not satisfy the bandwidth constraint. In this step, the links whose residual bandwidth is less the smallest bandwidth request of V(Bk) are eliminated.

Find separate shortest paths from each SAP to all others in the V(Bk) using the graph G=(V,E').

This step runs the shortest path algorithm over the links that can satisfy the bandwidth constraints of the largest n hose values. Note that the paths are bi-directional, with possibly (although with very small probability) different routes due to shortest path algorithm. Finding the shortest path between two edge nodes runs in $O(V2)$ and identifies n2 of such paths, making this step $O((nV)2)$. As n approaches V, this step becomes $O(V)4$. However, this is an instance of the well-known all pairs shortest paths algorithm, such as described in T. H. Cormen, C. E. Leiserson, R. L. Rivest, Introduction to Algorithms, The MIT Press, Cambridge, Mass., 1997, incorporated by reference herein, that can be solved through the matrix multiplication methods or through the Floyd-Warshall algorithm in $O(V3)$, which is more efficient than finding the shortest path from each node to every other node. Since this is an instance of a well known algorithm, it is not elaborated any further.

4. Put all the P routers in the shortest paths created in the previous step into a set T.
5. Connect all the remaining PE routers (ones that are not in the vector V(Bk)) with P routers of set T. Although this step of the algorithm, which is, connecting remaining PE routers with P routers, seems to be solved following the all-pairs shortest paths algorithm, it is a slightly different problem. The noteworthy difference is that with all-pairs shortest path algorithms, the shortest paths are calculated from each node to every other one. In this step, however, what is trying to be found is the shortest path from a given PE router to one of the P routers, where, which P router is not known a priori. Therefore, the problem here is to find the node in a set that will make the path to a given node the shortest. This is a subset of the shortest path problem. The algorithm that is described herein for step 5 is based on the Dijkstra's shortest path algorithm. First, a brief summary is provided of the execution of the shortest path algorithm and point out the specific implementation for the stated problem. After that, a pseudo code is provided for out implementation. The shortest path algorithm keeps a set of the nodes whose shortest distance from the original node is known. Initially, the set contains only the original node. At each iteration, a new node is added to the set for which the shortest path from the original node is found. Once a node is found, the algorithm performs a relaxation operation where each node that is not yet in the set is checked if its distance from the original node can be shortened by following the edges from the newly found node. Although the shortest path algorithm continues like this for the remaining nodes, for the purpose, it is necessary to check if the newly found node is a PE router in the set T. If it is, it is concluded that the shortest path from the original node (in this case a PE router) to the set T (via a PE router in set T) is found. The relaxation operation is performed and returned without further processing. Note that this step runs on the same original graph. The following function executes it for a given source node, that is, each of the PE routers that are not selected in step 2 is passed as the source to the function.

```
find_shortest_path_to_set_of_nodes(Graph G, int source, set <int> T, int parent[ ], int & p_router_id)
{
    int v; // the id of the node that is found at each iteration
    int num_nodes = G.size( ); // number of nodes in the graph
    vector <bool> found(num_nodes); // set of nodes found at each iteration
    vector <int> distance(num_nodes); // distance of each node from the source
    // initialization
    for (int i = 0; i < num_nodes; i++) {
        found[i] = false;
        parent[i] = NULL;
        if (G.has_edge(source, i) { distance[i] = G.weight(source,i); }
        else { distance[i] = MaxWeight; }
    }
    found[source] = true; // Mark the source node as found, that is, initialize the found set with source.
    distance[source] = 0;
    // run the iteration
    for (int i = 0; i < num_nodes; i++) { // Add one node to found set on each pass.
        int min = MaxWeight;
        for (int w = 0; w < num_nodes; w++)
            if (!found[w])
                if (distance[w] < min) {
                    v = w;
                    min = distance[w];
                }
        // select this node v.
        found[v] = true;
        // relax the nodes that are not found yet.
        for (int w = 0; w < num_nodes; w++)
            if (!found[w])
                if (min + G.weight(v,w) < distance[w]) {
                    distance[w] = min + G.weight(v,w);
                    parent[w] = v;
```

```
        }
    if (T.contains(v)) // we found the first PE router, stop here
        p_router_id = v;
        break;
        }
    }
}
```

The output of this function is the array parent and the p_router_id. The parent keeps the predecessor for each node on the path from the original node to the P router. P_router_id is the id of the P router that is closest to the original source. By traversing the parent array from the p_router_id to the origin, the path is found that connects the PE router to the P router in the set T with the shortest distance.

Worst case running time of this function is $O(n2)$ due to the two-level nested loops. Note that, with a balanced tree implementation of the set data structure, the T.contains() call executes in $O(\log n)$ which is faster than the two inner loops which are $O(n)$ each. Hence, that call doesn't contribute to the overall execution of this function by any order.

6. Now that the paths are found, the next step is to provision the bandwidth on those paths. For paths found in step 3 (i.e. between each pair of PE routers), provision the amount of the hose over all the paths connecting PE routers. For paths found in step 5 (i.e. between a PE router and a P router), provision the hose amount of the PE router on all links over the path from PE router to the P router.

In this algorithm, n is a parameter. It can be selected as the percentage of number of nodes (e.g. include the first 30% of PEs in the sorted list) or as the percentage of bandwidth (e.g. include the 40% of the total bandwidth requested from hoses) in the point-to-point paths. The parameter n is used to adjust the under-provisioning. For smaller n, there will be more under-provisioned links with respect to worst case scenario. As n becomes closer to number of PE routers, the solution will be similar to separate shortest paths between each pair.

Analysis of the algorithm: The most complex step of the algorithm is the step 3, which executes in $O(V3)$ and is the running time of the whole algorithm. $O(V3)$ is a very efficient running time for a problem otherwise NP-hard.

The IGP weights assigned by the network operator are assumed and honored by feeding them into the shortest path algorithms just like the well-known Constrained Shortest Path Algorithms. Such an algorithm and its use on MPLS networks are described in RFC3212. B. Jamoussi, Ed., L. Andersson, R. Callon, R. Dantu, L. Wu, P. Doolan, T. Worster, N. Feldman, A. Fredette, M. Girish, E. Gray, J. Heinanen, T. Kilty, A. Malis. Constraint-Based LSP Setup using LDP. January 2002, incorporated by reference herein.

2. Algorithm for Asymmetric Hose Provisioning

In asymmetric case, in and out bandwidth requirements are different, that is, it is not assumed that Bkin=Bkout for the PE router k. In this case, the in and out hose specifications is treated separately. In summary, the algorithm will first sort them into two sets. The shortest paths are found from the highest n PE in hoses to the n highest PE out hoses. Finally, each of the remaining in and out PE hoses are connected into a P router in the shortest paths of the previous step similarly to the symmetric case. The algorithm:

1. Sort Bkin and Bkout separately.
2. Select n largest Bkin's, Bkiin for $0<=i<=(n-1)$ where Bk0in is the largest and Bk(n-1)in is the smallest hose bandwidth amount. Call this vector V(Bkin). Similarly, select n largest Bkout's, Bkiout for $0<=i<=(n-1)$ where Bk0out is the largest and Bk(n-1)out is the smallest hose bandwidth amount. Call this vector V(Bkout).
3. Find shortest paths from each SAP in the set V(Bkin) to each of the SAPs in the set V(Bkout). This step will create a mesh of paths from the largest bandwidth hose ins to largest bandwidth hose outs. Similarly to the symmetric case, finding the shortest paths among the selected nodes runs in $O(V3)$.
4. Follow steps 4, 5 and 6 of the symmetric algorithm.

3. Algorithm for Preprocessing

Sometimes, sorting based on the hose size doesn't yield a good separation (e.g. when most hose sizes are the same). In such a situation, the algorithm shall perform a preprocessing by finding the good cuts before running the first step. In the method described in this document, the good cut is described as the set of hose points neighboring each other with minimum number of internal nodes. This preprocessing step shall be executed when selection of the n largest hoses becomes arbitrary when there are more hoses of equal size each than the number to be selected. Assume the number of equal size hoses is t of which u need to be selected. Note that this is an NP complete selection problem. However, the following algorithm will use a heuristic that will make the optimum selection for the purpose of yielding good cuts in polynomial time. Call the set of all t equal size hoses as S. The preprocessing steps to yield good cuts are:

1. Find the all pairs shortest paths among the t equal sized hoses (i.e. of all nodes in S): In this step, what is of interest is in the shortest path in terms of the number of internal nodes, therefore, all the link weights are taken as 1.
2. For each node in S, calculate the total distance of this node to all other nodes, that is, $td(i)=sum(d(i,j))$ for $0<<j<t$ and $j!=$where $d(i,j)$ is the distance from the first step.
3. Sort the nodes in S with respect to td(i) in increasing order. For equal td(i) and td(j), take td(i) first for i<j, that is, for nodes with the same total distance, take the one with the lowest index first.
4. Select the first u nodes.

The purpose of the preprocessing is to select the nodes that are closer to each other with respect to number of internal nodes among them. During the execution of the algorithm, links among these nodes will be provisioned with bandwidth allocation. Since the number of such links is small due to this preprocessing step, the total amount of bandwidth provisioned over these links will be smaller. However, there is a potential chance of resulting in under-provisioning. It is up to the user of this overall algorithm to decide on the parameter n for adjusting the amount of under-provisioning. The fact that the overall algorithm is very efficient gives opportunity to the user to experiment the algorithm with varying values of n.

Applications

The techniques described here can be applied to a variety of provider provisioned VPN technologies. For example, the provisioned paths correspond to virtual circuits in ATM and Frame Relay based VPN technologies and to LSPs in BGP/MPLS VPNs.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. A method for provisioning virtual private networks (VPNs) using a hose model comprising the steps of:
    determining an amount of bandwidth that a plurality of sites of a VPN network require to introduce hose into the network and receive hose from the network, where the bandwidth into equals the bandwidth from all sites;
    sorting the sites based on decreasing order of bandwidth requirements;
    choosing a predetermined number of the sites having a greatest amount of bandwidth required to introduce hose into the network;
    establishing shortest paths between each of the chosen sites; and
    using the established shortest paths for sites not chosen to send hose to and receive hose from the network.

2. A method as described in claim 1 wherein the establishing step includes the step of finding shortest paths to edge routers of the network.

3. A method as described in claim 2 including the step of eliminating any links where residual bandwidth is less than a smallest bandwidth request from the sites.

4. A method as described in claim 3 wherein the finding step includes the step of finding a shortest path from each service access point (SAP) to all other sites over links which can satisfy the largest amount of bandwidth requirements of sites to introduce hose into the network.

5. A method as described in claim 4 wherein the choosing step includes the step of connecting all edge routers of the network which have yet to be connected with the sites.

6. A method as described in claim 5 wherein the sorting step includes the step of sorting in decreasing order the amount of bandwidth requirements of the sites to introduce hose into and receive hose from the network as being equivalent.

7. A method as described in claim 5. including the step of sorting in decreasing order the amount of bandwidth requirements of the sites to introduce hose into the network and in decreasing order the amount of bandwidth requirements of the sites to receive hose from the network.

8. A method as described in claim 7 wherein the finding step includes the step of finding shortest paths from each SAP in communication with the predetermined number of sites chosen having the largest amount of bandwidth requirements to introduce hose into the network, to each SAP in communication with sites having the largest amount of bandwidth requirements to receive hose from the network.

9. A telecommunications system using a hose model comprising:
    a VPN virtual private network (VPN);
    a plurality of sites in communication with the VPN network, each site requiring an amount of bandwidth to introduce hose into the network and an amount of bandwidth to receive hose from the network; and
    a network manager in communication with the sites through the network, the manager sorts the sites based on decreasing order of bandwidth in; sorts the sites based on decreasing order of bandwidth out of the network; chooses a predetermined number of the sites having the greatest amount of bandwidth required to introduce hose into the network and from the network, establishes shortest paths between each of the chosen sites having the greatest amount of bandwidth in with the sites having the greatest amount of bandwidth out, and uses the established shortest paths for sites not chosen to send hose to and receive hose from the network.

10. A system as described in claim 9 wherein the network includes edge routers and core routers, and the manager finds shortest paths among edge routers over the core routers of the network.

11. A system as described in claim 10 wherein the manager eliminates any links where residual bandwidth is less than a smallest bandwidth request from the sites.

12. A system as described in claim 11 wherein the VPN network includes a provider network, at least one customer network, and Service Access Points (SAP) through which the customer networks are attached to the provider network and the manager finds the shortest path from each SAP to all sites over links which can satisfy the largest amount of bandwidth requirements of sites to introduce hose into the network.

13. A system as described in claim 12 wherein the manager sorts in decreasing order the amount of bandwidth requirements of the sites to introduce hose into and receive hose from the VPN network as being equivalent.

14. A system as described in claim 12 wherein the manager sorts in decreasing order the amount of bandwidth requirements of the sites to introduce hose into the VPN network and in decreasing order the amount of bandwidth requirements of the sites to receive hose from the VPN network.

15. A system as described in claim 14 wherein the manager finds the shortest paths from each SAP in communication with the predetermined number of sites chosen having the largest amount of bandwidth requirements to introduce hose into the VPN network, to each SAP in communication with sites having the largest amount of bandwidth requirements to receive hose from the VPN network.

16. A method for provisioning VPNs virtual private networks (VPNs) using a hose model comprising the steps of:
    determining an amount of bandwidth that a plurality of sites of a VPN network require to introduce hose into the network and receive hose from the network;
    choosing a predetermined number of the sites as a function of their amount of bandwidth required to introduce hose into the network, including the step of choosing the predetermined number of sites as a function of requiring the largest amount of bandwidth to introduce hose into the network;
    establishing shortest paths between each of the chosen sites by finding shortest paths to edge routers of the network including the step of finding a shortest path from each service access point (SAP) to all other sites over links which can satisfy the largest amount of bandwidth requirements of sites to introduce hose into the network;
    eliminating any links where residual bandwidth is less than a smallest bandwidth request from the sites; and
    using the established shortest paths for sites not chosen to send hose to and receive hose from the network.

17. A telecommunications system using a hose model comprising:

a virtual private network (VPN);

a plurality of sites in communication with the VPN network, each site requiring an amount of bandwidth to introduce hose into the network; and a network manager in communication with the sites through the network, the manager chooses a predetermined number of the sites as a function of their amount of bandwidth required to introduce hose into the network, establishes shortest paths between each of the chosen sites, and uses the established shortest paths for sites not chosen to send hose to and receive hose from the network, the network includes edge routers and core routers, and the manager finds shortest paths among edge routers over the core routers of the network, the manager chooses the predetermined number of sites as a function of requiring the largest amount of bandwidth to introduce hose into the network, the manager eliminates any links where residual bandwidth is less than a smallest bandwidth request from the sites, the VPN network includes a provider network, at least one customer network, and Service Access Points (SAPs) through which the customer networks are attached to the provider network and the manager finds a shortest path from each SAP to all sites over links which can satisfy the largest amount of bandwidth requirements of sites to introduce hose into the network.

18. A method for provisioning virtual private networks (VPNs) using a hose model comprising the steps of:

determining an amount of bandwidth that a plurality of sites of a virtual private network (VPN) network require to introduce hose into the network and receive hose from the network;

sorting the sites based on decreasing order of bandwidth in;

sorting the sites based on decreasing order of bandwidth out;

choosing a predetermined number of the sites having a greatest amount of bandwidth required to introduce hose into the network and out of the network;

establishing shortest paths between each of the chosen sites having the greatest amount of bandwidth in with the sites having the greatest amount of bandwidth out; and using the established shortest paths for sites not chosen to send hose to and receive hose from the network.

19. A telecommunications system using a hose model comprising:

a virtual private network (VPN);

a plurality sites in communication with the VPN network, each site requiring an amount of bandwidth to introduce hose into the network and an amount of bandwidth to receive hose from the network whose bandwidth into equals bandwidth from; and a network manager in communication with the sites through the network, the manager sorting the sites based on decreasing order of bandwidth, choosing a predetermined number of the sites having the greatest amount of bandwidth required to introduce hose into the network, establishes shortest paths between each of the chosen sites, and uses the established shortest paths for sites not chosen to send hose to and receive hose from the network.

* * * * *

UNITED STATES PATENT AND TRADEMARK OFFICE
CERTIFICATE OF CORRECTION

PATENT NO. : 7,468,946 B2  Page 1 of 1
APPLICATION NO. : 10/883533
DATED : December 23, 2008
INVENTOR(S) : Yucel It is certified that error appears in the above-identified patent and that said Letters Patent is hereby corrected as shown below:

In Column 9, Line 51, in Claim 7, delete "5." and insert -- 5 --, therefor.

Signed and Sealed this

Second Day of June, 2009

JOHN DOLL
*Acting Director of the United States Patent and Trademark Office*